__United States Patent__ [19]

Elliott et al.

[11] 4,051,048

[45] Sept. 27, 1977

[54] OIL-SOLUBLE HYDROLYZED ANIONIC-GRAFT POLYMER OF ETHYLENE-PROPYLENE COPOLYMER AND ANIONICALLY POLYMERIZABLE NITRILE MONOMER AND DERIVATIVES THEREOF HAVING UTILITY AS MULTIFUNCTIONAL V. I. IMPROVER FOR LUBRICATING OILS

[75] Inventors: Robert L. Elliott, Scotch Plains; J. Brooke Gardiner, Mountainside, both of N.J.

[73] Assignee: Exxon Research & Engineering Co., Linden, N.J.

[21] Appl. No.: 732,143

[22] Filed: Oct. 13, 1976

Related U.S. Application Data

[63] Continuation-in-part of Ser. No. 680,077, April 26, 1976.

[51] Int. Cl.$^2$ .................... C10M 1/32; C10M 1/18
[52] U.S. Cl. .................... 252/51.5 R; 252/51.5 A; 252/50; 252/56 R; 252/55; 260/878 R
[58] Field of Search ............... 252/51.5 A, 51.5 R, 252/50, 56 R, 55; 260/878 R

[56] References Cited

U.S. PATENT DOCUMENTS

| | | | |
|---|---|---|---|
| 3,687,849 | 8/1972 | Abbott et al. | 252/51.5 A |
| 3,864,268 | 2/1975 | Culbertson | 252/515 A |
| 3,879,304 | 4/1975 | Waldbillig | 252/51.5 A |

*Primary Examiner*—Arthur P. Demers
*Attorney, Agent, or Firm*—Roland A. Dexter; Frank T. Johmann

[57] ABSTRACT

An oil-soluble, hydrolyzed, anionic-graft polymer of an anionically polymerizable nitrile monomer, preferably a $C_3$–$C_{24}$ vinyl cyanide monomer, e.g. acrylonitrile, and an anion of an oxidized copolymer of ethylene and at least one $C_3$ to $C_{50}$ alpha monoolefin, e.g. propylene, said anionic-graft polymer in its preferred form containing from about 0.005 to 2% by weight nitrogen and having a number average molecular weight of from about 1000 to 500,000, has utility as a multifunctional V.I. improver and/or dispersant for lubricating oils or as an intermediate for derivatization, as by reaction with a nitrogen compound, to increase the oil additive activity.

21 Claims, No Drawings

OIL-SOLUBLE HYDROLYZED ANIONIC-GRAFT POLYMER OF ETHYLENE-PROPYLENE COPOLYMER AND ANIONICALLY POLYMERIZABLE NITRILE MONOMER AND DERIVATIVES THEREOF HAVING UTILITY AS MULTIFUNCTIONAL V. I. IMPROVER FOR LUBRICATING OILS

RELATED APPLICATION

This application is a comtinuation-in-part of Ser. No. 680,077 filed Apr. 26, 1976.

BACKGROUND OF THE INVENTION

1. Field of the Invention

This invention relates to multipurpose oil-soluble additives for lubricating oils which have utility to impart to an oil when incorporated therein an improved viscosity index and/or sludge dispersancy and/or pour point depressancy and/or oxidation stability and to the preparation of such additives. Broadly, the novel additives are polymers prepared by hydrolysis of an anionic-graft polymer obtained from polymerization of nitrile monomers containing at least one vinylidene group onto an anion of an oxidized copolymer of ethylene and propylene. The present invention teaches the additional use of these hydrolyzed anionic graft polymers as precursors for post polymerization functionalization.

2. Description of the Prior Art

The literature abounds with discussions of multifunctional viscosity index (V.I.) improvers usually containing nitrogen to enhance their dispersant activity including polymeric nitrile-containing substances as lubricating oil additives with detergent-dispersant and other properties.

The preparation of such multifunctional V.I. improving polymeric substances according to the prior art included: copolymerization of one or more olefins with a nitrile-containing monomer (U.S. Pat. No. 3,445,387); free radical-grafting of a hydroperoxidized ethylene copolymer with a polar vinylidene monomer, such as acrylonitrile (see U.S. Pat. No. 3,404,091); reacting a nitrile-containing compound with a reactive copolymer such as is obtained from free radical-grafting of maleic anhydride to polyisobutylene (see U.S. Pat. No. 3,488,049); reacting an alkenyl cyanide with an alkenyl amine and a hydrocarbon-substituted succinic acid-producing compound (see U.S. Pat. No. 3,278,550); free radical-grafting an ester of an amino alcohol onto an oxidized interpolymer of ethylene and propylene (see U.S. Pat. No. 3,687,849); thermally reacting amines with an oxidized ethylene-propylene copolymer (see U.S. Pat. No. 3,864,268); and, by hydrolysis of the free radical graft of acrylonitrile onto ethylenepropylene copolymer (see U.S. Pat. No. 3,326,804).

These processes which utilize free radicals have certain disadvantages including irreversible crosslinking of the copolymer and homopolymerization of monomeric components. The crosslinking disadvantage is shown in U.S. Pat. No. 3,236,917 wherein initiation of the desired addition reaction by generation of free radicals also provokes grafting of a single molecule of maleic anhydride into two copolymer chains thereby irreversibly crosslinking the copolymer and markedly decreasing its solubility in oil. One approach to overcoming this disadvantage is shown in U.S. Pat. No. 3,378,492 which teaches grafting an unsaturated hydrocarbon polymeric compound, e.g. polybutadiene, directly with an unsaturated, polar, nitrogen-containing organic compound, e.g. acrylonitrile.

Another approach to preparing an oil-soluble nitrogeneous ashless dispersant involves reacting an alkali metal salt of a long-chain ketone with acrylonitrile (see U.S. Pat. Nos. 3,565,803 and 3,723,501). Unfortunately, formation of the dialkyl ketone precursor is by ozonization which is an expensive and hazardous process involving dimethyl sulfide, an environmentally toxic agent. Also taught as a multifunctional additive for lubricating oils is the anionic-graft polymer of a lithiated ethylene-propylene-hexadiene terpolymer with an amino methacrylate monomer (see U.S. Pat. No. 3,879,304).

It is well known and widely practiced in commerce to provide lubricants with improved dispersancy by the addition of metal free dispersants of the acylated amine types as described in U.S. Pat. No. 3,272,746 wherein such dispersants are stated to be characterized by the structural presence of a substantially saturated hydrocarbon polar group of the class of acyl, acylimidoyl and acyloxy radicals having a nitrogen atom attached directly to said group.

STATEMENT OF THE INVENTION

It has been found that multifunctional viscosity improvers of enhanced dispersancy can be obtained by hydrolysis of a graft copolymer of an anion oxidized copolymer of ethylene and one or more $C_3$ to $C_{50}$, preferably $C_3$ to $C_{18}$, alpha monoolefins with a $C_3$ to $C_{50}$ anionically polymerizable nitrile monomer which hydrolyzed polymeric product of said polymer can be utilized in itself or may be used as intermediate for polymers tailored to provide functionality requisite for a given application.

It has been found that hydrolysis of the graft polymer containing nitrile groups results in diverse sites which can be used per se to provide multifunctionality or which can be derivatized to modify multifunctionality, e.g. aminated with an alkylene polyamine in order to introduce additional nitrogen into the copolymer for enhanced dispersancy and/or reduction of piston varnish.

This finding has in accordance with this invention, made possible the realization of a new class of multifunctionalized polymeric products containing oxygen and nitrogen which in their most useful form are additives for lubricating oil compositions.

In their preferred form, this novel class of products can be characterized as oil-soluble additives formed either directly or subsequently (as by derivatization) from the hydrolysis of an anionic graft polymer of a $C_3$ to $C_{24}$ mono-ethylenically unsaturated nitrile monomer i.e., a polar monomer containing a vinylidene group, and an anion of an oxidized copolymer of ethylene and at least one $C_3$ to $C_{50}$ alpha olefin monomer. The hydrolysis may be catalyzed by either base or acid.

In their optimum form the products of the invention are hydrocarbon soluble, nitrogen-containing, hydrolyzed anionic-graft copolymers of ethylene and propylene having a number average molecular weight ($\overline{M}n$) of from 1,000 to about 500,000 and containing from about 0.005 to 2%, preferably 0.05 to 0.8%, optimally 0.1 to 0.4%, by weight nitrogen which demonstrate outstanding dispersancy and have utility as ashless sludge dispersants.

Thus the invention in one aspect can be described as oleaginous, e.g. lubricating oil, compositions comprising a lubricating oil and at least a minor but effective proportion of an oil-soluble polymeric product, said product comprising the reaction product of a nitrogen compound having one or more amino groups with the hydrolysis product of a nitrile grafted copolymer of an oxidized copolymer of ethylene and at least one $C_3$ to $C_{50}$ alpha monoolefin, said copolymer containing from about 0.005 to 6 wt. % oxygen, from about 0.005 to 2% nitrogen and having a number average molecular weight ($\overline{Mn}$) of from about 1000 to about 500,000 (preferably from about 1,000 to 10,00 for dispersant applications and from 10,000 to about 200,000 for V.I. improving-dispersant applications). Thus, for dispersant applications said hydrolyzed polymer will be present in said lubricating oil in at least a dispersing amount and for V.I. improver applications in at least a V.I. improving-dispersing amount. Both the derivatized-hydrolyzed and hydrolyzed copolymers of the invention are suitable for lubricating oil applications when they posses sufficient oil-solubility, i.e. at least about 10 wt. % at 20° C. based on the total weight of the lubricating oil composition; however, when oil-insoluble the aforesaid copolymers of the invention have application as oil-resistant rubbers in seals and gaskets for automobile automotive transmissions, thermoset resins for encapsulating electronic devices, etc. or other uses as will be apparent from the following discussion.

The Copolymer

The term "copolymer" as used herein and in the appended claims, refers to copolymers derived from essentially ethylene and propylene; however, such copolymers may contain minor amounts, i.e. up to 20 mole percent, preferably about 1 to about 7 mole percent based on the molar amounts of the monomeric ethylene and propylene units in the copolymer, of polymerized units derived from other olefin monomers. Such other olefin monomers include olefins of the general formula $RCH = CH_2$, in which R is an aliphatic or cycloaliphatic radical of from 2 to about 48 carbon atoms, for example, 1-butene, 1-pentene, 4-methyl-1-pentene, 1-hexene, 1-heptene, 1-octene, 1-nonene, 1-decene, 4-methyl-1-nonene, 5,5-dimethyl-1-pentene; 5-methyl-1-hexene; 4-methyl-1-heptene; 5-methyl-1-heptene; 6-methyl-1-heptene, 4,4-dimethyl-1-hexene, 5,6,6,-trimethyl-1-heptene, etc. Such other olefins also include monomers having a plurality of double bonds, in particular diolefins containing from about 4 to about 26 carbon atoms, e.g. 1,3-butadiene, 1,4-pentadiene, 2-methyl-1,5-hexadiene, 1,7-octadiene, etc. and preferably non-conjugated diolefins such as vinylidene norbornene, 5-methylene-2-norbornene and 1,4-hexadiene.

Suitable ethylene copolymers contain from about 2 to about 98 wt. % ethylene and one or more $C_3$ to $C_{50}$ alpha-monoolefins, preferably propylene with a degree of crystallinity of less than 25 weight % as determined by X-ray and differential scanning calorimetry. More usually the ethylene-propylene copolymers contain from about 20 to 80 mole percent ethylene and from about 20 to about 80, preferably from about 35 to about 65 mole percent propylene and have a numbr average molecular weight ($\overline{Mn}$) of from about 1000 to about 500,000, preferably about 10,000 to about 200,000, optimally from 20,000 to 100,000.

Methods of preparation of the copolymers are well known including descriptions in U.S. Pat. Nos. 2,700,633; 2,726,231; 2,792,288; 2,933,480; 3,000,866; 3,063,073; 3,093,621 and literature reviews such as "Polyolefin Elastomers Based on Ethylene and Propylene", by F.P. Baldwin and G. VerStrate in Rubber Chem. & Tech. Vol. 45, No. 3, 709-881, (1972) and "Polymer Chemistry of Synthetic Elastomers," edited by Kennedy and Tornqvist, Interscience, N.Y. 1969.

In accordance with this invention, these copolymers which as indicated include terpolymers, for example, a terpolymer of ethylene, propylene and a non-conjugated diene such as 2-ethylidine-5-norbornene can be anionically polymerized accordiang to the invention provided the terpolymer is suitably oxidized whereby sites for graft polymerization are created. Ethylene-propylene-non-conjugated diolefin terpolymers are known articles of commerce, including VISTALON®, an elastomeric copolymer of ethylene, propylene and 5-ethylidene-2-norbornene, marketed by Exxon Chemical Co. New York, N.Y., and Nordel®, a copolymer of ethylene, propylene and 1,4-hexadiene, marketed by E.I. duPont de Nemours and Co., Wilmington, Delaware.

Oxidation of the Copolymer

The oxidation can be accomplished by contacting the compolymer under suitable conditions of temperature and at atmospheric or elevated pressures, with an oxidizing agent such as air of free oxygen, or any oxygen-containing material capable of releasing oxygen under the oxidation conditions. If desired, the oxidation can be conducted in the presence of known oxidation catalysts such as platinum or a platinum group metal, and compound containing metals such as copper, iron, cobalt, cadmium, manganese, vanadium, etc. The oxidation can be carred out by methods described in U.S. Pat. Nos. 2,982,728; 3,316,177; 3,153,025; 3,365,499; 3,544,520 and 3,864,268.

Generally, the oxidation can be carried out over a wide temperature range depending upon the activity of the agent used, for example, with air, temperatures in the range of 35°–425° C. have been used. Further, depending upon the rate desired, the oxidation can be conducted at sub-atmospheric, atmospheric or super-atmospheric pressures, and in the presence of a copolymer solvent. The conditions of temperature, pressure, oxygen content of the oxidizing agent, the rate of introducing the oxidizing agent, the catalyst employed, if any, etc., are correlated and controlled by those skilled in the art, so as to obtain the desired optimum results.

Oxidation of the copolymers and terpolymers dissolved in a solvent such as mineral oil is conveniently carried out, either in batches or continuously, in a stirred reactor with air, or air prediluted with an inert gas such as nitrogen or carbon dioxide so as to minimize explosion hazards. The air, or diluted air, may be introduced into the oil-polymer solution in a finely divided state through the use, for example, of sparger tubes fitted with porous ALUNDUM®, or fritted glass thimbles, or similar means posessing a forminiferous-like structure, at a temperature in the range of about 80° to 300° C., preferably 100° to 230° C. Rapid agitation of the reactor contents, as for example, by means of a turbomixer is desirable in large batches, to ensure an optimum reaction rate and a low oxygen content in the off-gas.

In general, in the range of 0.5 to 90, e.g. 4 to 60 weight percent of the oil copolymer solution will be copolymer. Usually, about 20 to 60 weight percent of the solution will be copolymer when the polymer is of low mol. wt., e.g., with a number average molecular weight ($\overline{Mn}$)

less than 20,000. For copolymers with Mn equal to or greater than 20,000, the preferred concentrations are in the range of 4 to 20 weight percent copolymer, based on the total weight of the oil-copolymer solution.

A wide variety of mineral lubricating oils which widely range in viscosity and crude source, may be used as solvents for the polymer-oil solutions to be oxidized. The oils may be derived from Pennsylvania, Midcontinent or Coastal crudes, Middle East crudes, Venezuelan crudes, etc., and may range in viscosity from about 5 to 1000 SUS at 38° C., preferably 10 to 600 SUS at 38° C., most preferably 80 to 200 SUS at 38° C. They may be straight-run distillates in the lubricant range, e.g., boiling above 315° C., or may have been further refined by deasphalting; dewaxing; solvent extracted; treated with sorbents; or refined by hydrogenation; etc. Also suitable are synthetic hydrocarbon oils in the lubricant range made by polymerization, oligomerization, alkylation of aromatics with olefins, and the like.

Oxidation of the oil-copolymer solution is conducted for a time sufficient to impart to the solution a combined oxygen content of about 0.01 to 10.0, e.g., 0.1 to 8, preferably 0.1 to 5.0 weight percent, depending on the composition of the oil, the copolymer and the concentration of copolymer in solution; however, the oxygen content of the copolymer can range from 0.005 to 6 wt. %.

A measure of the degree of oxidation is the specific absorption exhibited by oxygen-containing group functionality about 5.8 microns in the infrared. Oxygen group functionality may conveniently be measured with an infrared spectrometer using 0.05 mm to 0.5 mm specimen thickness and sodium chloride cells. The oxygen group absorption in the useful range of oxidized solutions will usually be in the range of about 0.05 to 5.0 (based on a 0.5 mm cell) and depending on the oil, polymer and polymer concentration. Usually, the lower absorption values can be directly measured in a 0.5 mm cell, while higher absorption values are best measured in thinner cells, e.g., 0.1 mm or .2 mm cells and the values may be extrapolated to a 0.5 mm cell, if desired for comparison purposes. As used herein, such terms as "oxidized", or "oxidized oil copolymer solution" etc. indicates that air or oxygen-containing gas is preferably used for the oxidation, and does not preclude the use of other oxidative reagents such as ozone.

Alternatively the copolymer can be oxidized in the absence of a solvent as by oxidative degradation of the copolymer. This oxidation approach is well known in the art (see French application No. 75.23806) whereby oxygen is incorporated into the copolymer by an air-mastication procedure. This procedure may be done with a single piece of equipment or in stages. Useful equipment includes Banbury mixers and mills wherein the copolymer is readily exposed to air, which devices may be enclosed in jacketed containers through which a heating medium may be passed such as superatmospheric steam, or heated DOWTHERM®. When oxidation resulting from the air-mastication has reached a desired level i.e. at least about 0.005 wt. % oxygen and up to 6 wt. % as determined by oxygen uptake in said copolymer, mineral oil may be added to provide a concentration of the oxidized copolymer in the range of about 5 weight percent to 50 weight percent based on the weight of the total resulting solution. The resulting oil solution may thereafter be reacted with an alkyllithium compound to yield an anionic solution of the resultant oxidized copolymer.

Where oxidation is provided by this air-mastication process, the copolymer is preferably limited to ethylene and one or more alpha-monoolefins having from 3 to 50 carbons and preferably, propylene, to avoid deleterious crosslinking during oxidation.

ANIONICALLY POLYMERIZABLE NITRILE MONOMERS

Broadly, the anionically polymerizable nitrile monomers contemplated by the present invention generally consist of carbon, hydrogen and nitrogen and contain a monoethylenically unsaturated group such as the preferred vinylidene group. It is to be understood that the anionically polymerizable nitrile monomers may contain substituent groups such as ketone, hydroxyl, ether, mercapto, sulfide, sulfoxide, sulfonyl, etc. These nitrile monomers will contain about 3 to 50 carbon atoms and must contain at least one electron withdrawing group in such proximity to the unsaturation that the olefinic bond is thereby activated allowing polymerization with the anionic copolymer.

The unsaturated, polar, anionically polymerizable nitrile monomers to which the present invention is particularly directed include both the $C_3$-$C_{24}$ vinyl cyanide monomer class which has the formula:

or the $C_3$-$C_{24}$ allyl cyanide monomer class which has the formula

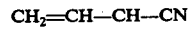

wherein $R^V$ is a hydrogen atom or a lower alkyl group having up to about 12 carbons, e.g., methyl, ethyl and the like and X is a hydrogen atom, a halogen atom, a cyano or a lower alkyl group having up to about 6 carbons, e.g. methyl, ethyl, propyl, butyl and the like. The $C_3$-$C_{24}$ vinyl cyanide monomers are optimally used. Nonlimiting examples of nitrile monomers which are contemplated by the aforedescribed structures include, acrylonitrile, methacrylonitrile, alphabromoacrylonitrile, alpha-chloroacrylonitrile, vinylidene cyanide, allyl cyanide and the like. Preferred are acrylonitrile and methacrylonitrile.

Also useful are the $C_9$-$C_{24}$ aryl-substituted alkenyl nitriles such as 1-phenylvinyl nitrile, 2-phenylvinyl nitrile, 1-tolylvinyl nitrile or 2-phen-ethylvinyl nitrile.

PREPARATION OF ANIONIC GRAFT POLYMER

The preparation of the anionic graft polymer from the oxidized copolymer is theorized to occur by abstraction of the acidic proton located alpha to a carbonyl structure present in the oxidized polymer. Oxidation of the ethylene copolymer is believed to introduce a multiplicity of complex carbonyl structures such as keto-, aldo- and acido- into the backbone of the polymeric molecules. Preparation of the anion of the oxidized copolymer does not measurably alter these carbonyl structures; however, strong bases such as butyllithium appear from infrared analysis (under certain circumstances) to act as a Grignard reagent and reduce said carbonyl moiety; e.g. to a hydroxy moiety. The anionically polumerizable nitrile monomer is then grafted under mild conditions onto said anionic copolymer backbone to form the anionic-graft polymer. The preparation of the anionic-graft polymer is thus a two-stage reaction.

The first stage of the reaction comprises contacting said substantially linear oxidized copolymer in a solvent with an alkyllithium compound of from 3 to 10 carbons. The first stage contacting is conducted under anhydrous conditions (less than 0.01 wt. % water) and under an inert atmosphere, e.g., nitrogen and at a temperature between about 20° and 100° C., normally for a period of between 1 and 25 hours. The first stage contacting employs between about 1.0 and 200 millimoles alkyllithium/100 g. of said oxidized copolymer. The requisite amount of catalyst is determined by the amount of carbonyl functionality of said oxidized copolymer.

In the second stage of the reaction, the anion of said oxidized ethylene copolymer is contacted with an anionically polymerizable nitrile monomer or mixture of said monomers to yield said anionic-graft polymer. Usually both of the reactions are carried out in an inert solvent. These solvents may be polar or non-polar. Illustrative hydrocarbon solvents include benzene, toluene, cumene and preferably hydrocarbons of from 6 to 10 carbon atoms such as hexane, cyclohexane and heptane. Other solvents include ethers, both aliphatic and aromatic such as diethyl ether, and dimethyl ether with tetrahydrofuran being preferred. Individual solvents or mixtures may be used. A highly useful solvent is mineral oil or mixtures thereof in which the anionic oxidized copolymer is generally prepared.

The anionically polymerizable nitrile monomer may be added either batchwise or incrementally to anionic oxidized ethylene-propylene copolymer solution. When grafting the preferred acrylonitrile or methacrylonitrile onto said anionic copolymer, the monomer is added incrementally with vigorous stirring so as to obtain relatively homogeneous diffusion of these preferred anionically polymerizable nitrile monomers into the reaction mixture.

The polymerization of said anionic copolymer and said nitrile monomer is carried out generally in the range of between about 0° and about 100° C. with agitation at atmospheric pressures or under superatmospheric pressure up to as high as 2000 psi. The time of reaction varies between about 0.2 and about 15 hours, preferably between about 0.5 and about 5 hours.

The polymerization catalyst is any strong organic base or aqueous base which will form the anion. The counter ion will be preferably an alkali metal such as lithium, sodium or potassium. A number of illustrative nonlimiting examples include sodium naphthylide, potassium amide, slodium crown etherates, etc. Suitable organolithium catalysts may be represented by the formula RLi wherein R is a $C_2$ to $C_{20}$ alkyl, aralkyl, or cycloalkyl group. Specific examples of suitable catalysts include n-propyllithium, isopropyllithium, n-butyllithium, tertiary butyllithium, etc. with n-butyllithium being preferred. Strong organic bases (e.g. triethylamine) and aqueous bases (e.g. sodium hydroxide, potassium hydroxide, calcium hydroxide, barium hydroxide and the like) and alkoxides (e.g. sodium ethoxide) are also useful.

The proportions in which the above-described nitrile monomers are to be used may range widely according to the ability of said oxidized copolymer and said nitrile monomer to react with each other, but normally should range from about 0.1 to 400, preferably about 10 to about 200, parts by weight of said monomer to 100 parts by weight of said oxidized copolymer (said oxidized copolymer containing from about 0.005 to 6 wt. %., preferably 0.01 to 3 wt. %, oxygen). Termination of the anionic-graft polymerization is readily carried out by the addition of relatively small, e.g. 0.01 to 10 wt. % based on the weight of said polymer, of a proton-releasing solvent such as methanol, isopropanol and acetone.

HYDROLYSIS OF ANIONIC GRAFT POLYMERS

The present invention arose out of the finding that hydrolysis of these anionic ethylene copolymers grafted with nitrile monomers provides a novel polymer composition which can be used per se as a dispersant and/or V.I. improver or which can be used as an intermediate for the preparation of other novel polymers particularly useful as multifunctional V.I. improvers for mineral oil lubricants. When used as an intermediate, these hydrolyzed anionic-graft polymers can be tailored to provide varying functional groups requisite for a given application. For example, as in the case of an acrylonitrile graft the polymer can be readily hydrolyzed to provide sites for reaction with alkylene polyamines to provide enhanced lube oil dispersancy.

The hydrolysis of these nitrile grafted polymers is readily carried out under alkaline (base hydrolysis) or acidic (acid hydrolysis) conditions. Suitable bases include alkali metal and alkaline earth metal bases such as sodium hydroxide, potassium hydroxide, calcium hydroxide, barium hydroxide and the like. Suitable acids are mineral acids such as sulfuric acid, nitric acid, hydrochloric acid and the like. Both the base and acid hydrolysis can be carried out at a temperature ranging from about 0° to about 225° C., preferably from about 20° to about 125° C. The hydrolysis is usefully carried out at relatively mild conditions, i.e. only a catalytic amount of the hydrolyzing agent is employed.

Although the resulting structure of said graft copolymer is not known for certain, it appears that the anionic copolymer grafted with acrylonitrile has infrared discernible

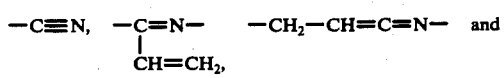

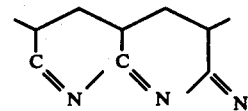

groups so that base and acid hydrolysis completion can be determined by the disappearance of, i.e. minimal, absorption at the 1590 cm$^{-1}$ band and loss of orange-yellow color. The hydrolysis process is essentially that taught for the hydrolysis of polymethacrylonitrile by C. G. Overberger et al which was reported in Journal of Polymer Science, Vol. XLV, Pages 127-144 (1960). The acid or base hydrolysis appears to convert above referenced groups to

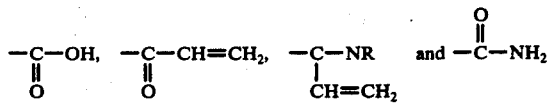

groups; any one or all of which can be reacted with nitrogen compounds to form multifunctional products.

NITROGEN COMPOUNDS

Nitrogen compounds having one or more amino groups which are useful for reaction with the hydrolyzed graft polymers of this invention include mono- and polyamines of about 2 to 60, e.g. 3 to 20 total carbon atoms and about 1 to 12, e.g. 2 to 6 nitrogen atoms in the molecule. The amine compounds may be hydrocarbyl amines or may include hydroxy groups, alkoxy groups, amide groups or may be cyclic in structure such as imidazolines and the like. Preferred amines are aliphatic, saturated amines, including those of the general formulae:

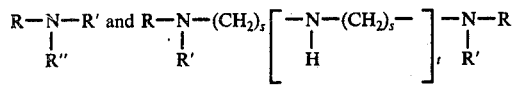

wherein R, R' and R" are independently selected from the group consisting of hydrogen; $C_1$ to $C_{12}$ straight or branched chain alkyl radicals; $C_1$ to $C_{12}$ alkoxy $C_2$ to $C_6$ alkylene radicals; $C_2$ to $C_{12}$ hydroxy or amino alkylene radicals; and $C_1$ to $C_{12}$ alkylamino $C_2$ to $C_6$ alkylene radicals; s is a number of from 2 to 6, preferably 2 to 4; and t is a number of from 0 to 10, preferably 2 to 6.

Non-limiting examples of suitable amine compounds include: mono-, di- and tri-tallow amines; 1,2-diaminoethane; 1,3-diaminopropane; 1,4-diaminobutane; 1,6-diaminohexane; diethylene triamine, triethylene tetramine, tetraethylene pentamine; 1,2-propylene diamine; di-(1,2-propylene) triamine, di-(1,3-propylene) triamine, N,N-dimethyl-1,3-diaminopropane; N,N-di-(2-aminoethyl) ethylene diamine; N,N-di-(2-hydroxyethyl)-1,3-propylene diamine; 3-dodecyloxypropylamine; N-dodecyl-1,3-propane diamine; tris-hydroxymethyl methylamine, diisopropanol amine, and diethanol amine.

Other useful amine compounds include: alicyclic diamines such as 1,4-bis-(aminoethyl) cyclohexane, and heterocyclic nitrogen compounds such as imidazolines and N-aminoalkyl piperazines of the general formula:

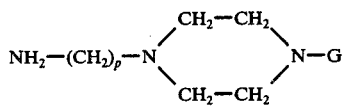

wherein G is independently selected from the group consisting of hydrogen and Ω aminoalkylene radicals of from 1 to 3 carbon atoms; and p is an integer of from 1 to 4. Non-limiting examples of such amines include 2-pentadecyl imidazoline; N-(2-aminoethyl) piperazine; N-(3-aminopropyl) piperazine; and N,N'-di-(2-aminoethyl) piperazine.

Commercial mixtures of amine compounds may advantageously be used. For example, one process for preparing alkylene amines involves the reaction of an alkylene dihalide (such as ethylene dichloride or propylene dichloride) with ammonia, which results in a complex mixture of alkylene amines wherein pairs of nitrogens are joined by alkylene groups, forming such compounds as diethylene triamine, triethylenetetramine, tetraethylene pentamine and isomeric piperazines. Low cost poly(ethyleneamines) compounds having a composition approximating tetraethylene pentamine ae available commercially under the trade name Polyamine 400 (PA-400), marketed by Jefferson Chemical Co., New York, N.Y. Similar material may be made by the polymerization of aziridine, 2-methyl aziridine and azetidine.

Still other amines with amino groups separated by hetero atom chains such a polyethers or sulfides can be used.

It is generally desired to form oil-soluble anionic graft (both as the hydrolyzed form and the derivatized form) polymers containing about 0.005 to 2%, preferably about 0.05 to 0.8%, by weight nitrogen (all of said % by weight nitrogen values in this specification are determined by the Kjeldahl method).

The hydrolyzed and derivatized anionic-graft polymers of the invention broadly contain from 0.005% to about 10% by weight nitrogen. As the nitrogen content increases above about 0.8 wt. %, the polymer becomes increasingly less soluble in mineral oil whereby its utility as a hydrocarbon resistant material is increased.

POLYMER APPLICATIONS

Generally, the number average molecular weights of the anionic-graft polymer of the present invention, employed as lubricant additives, will be in the range of about 1000 to about 500,000 and preferably will be in the range of about 10,000 to 200,000 for multifunctional V.I. improving-dispersant applications. However, it will be understood that higher or lower molecular weight products may be prepared in accordance with the present invention, if desired. All molecular weight values set forth in this specification are number average molecular weights ($\overline{M}n$) as determined by vapor phase osmometry (VPO) and membrane osmometry (MO).

When the polymers of this invention are employed in lubricating oils, they are preferably added in proportions of about 0.01 to about 20.0% or more, preferably about 0.1 to 10.0%, and more preferably about 0.5 to 5.0 percent by weight. The proportions giving the best results will vary somewhat according to the nature of the polymer additive, the nature of the lubricating oil base stock to which it is added and the specific purpose which the lubricant is to serve in a given case. For commercial purposes, it is convenient to prepare concentrated oil solutions in which the amount of the polymer in the composition ranges from 20 to about 80% by weight, and to transport and store them in such form. In preparing a lubricating oil composition for use as a crankcase lubricant the polymeric concentrate is merely blended with the base oil in the required amount.

The products of the present invention may be employed not only in ordinary hydrocarbon lubricating oils but also in the "heavy duty" type of lubricating oils which have been completed with such detergent type additives as metal soaps, metal phenates, metal alcoholates, thiophosphates, amines and amine derivatives, reaction products of metal phenates and sulfur, reaction products of metal phenates and phosphorous sulfides, metal phenol sulfonates and the like. The polymeric additives of the present invention may be used in lubricating oils containing other additives such as barium nonyl phenol sulfide, nickel oleate, barium octadecylate, calcium phenol stearate, zinc diisopropyl salicylate, aluminum naphthenate, zinc methylcyclohexyl thiophosphate, etc.

The lubricating oil base stocks used in the compositions of this invention may be straight mineral lubricating oils or distillates derived from paraffinic, naphthenic, asphaltic, or mixed base crudes, or, if desired, various blended oils may be employed as well as residuals, particularly those from which asphaltic constituents have been carefully removed. Hydrogenated oils, white oils, or shale oil may be employed as well as synthetic oils prepared, for example, by the polymerization of olefins or by the reaction of oxides of carbon with hydrogen or by the hydrogenation of coal or its products.

For best results the base stock chosen should normally be that of an oil which (without the new polymer additive present) gives the optimum performance in the service contemplated, e.g. lubricating oils for normal applications have a viscosity which usually ranges from about 40 to 150 seconds Saybolt viscosity at 99° C. but for the lubrication of certain low and medium speed diesel engines the lubricating oil base stock is prepared from naphthenic or aromatic crudes and has a Saybolt viscosity at 99° C. of 45 to 90 seconds and for gasoline engine service, oils of higher viscosity index are often preferred, for example, up to 75 to 100, or even higher, viscosity index.

The invention will be further understood by reference to the following examples which include preferred embodiments.

EXAMPLE 1

To a stirring solution of 50 grams of oxidized (air masticated) ethylene-propylene copolymer (44 wt. % [about 54 mole %] ethylene and 56 wt. % propylene) of 23,000 ($\overline{M}n$) in dry tetrahydrofuran (500 ml) maintained at ambient temperature and under a nitrogen atmosphere was rapidly added 8 ml. of a 1.6 molar solution of n-butyllithium in hexane. The mixture was slowly heated to 50° C. with stirring then stirred for ca. 1 hour while returning to room temperature. The solution was then treated with a solution of acrylonitrile (5 ml.) in dry tetrahydrofuran (25 ml). The solution was slowly heated to 50° C, with agitation and additional stirring continued for 25 hours.

The reaction was terminated with 4 ml. of methanol, stirred for ca. 62 hours nd then the anionic-graft polymer was isolated by precipitation with isopropanol (2 liters). The resulting polymer was washed with isopropanol (500 ml), then acetone (twice with 500 ml portions), then dried in a vacuum oven at 100° C. for 15 hours, after which 46.4 g. of an orange colored polymer was recovered (yield of about 92%). The anionic graft polymer contained 0.20 wt. % nitrogen (as determined in Kjeldahl method).

EXAMPLE 2

The procedure of Example 1 was followed except 30 grams of oxidized (air masticated) ethylene-propylene copolymer in 250 ml. of tetrahydrofuran was used. Graft polymerization was conducted using 3 ml. of acrylonitrile. The polymer contained 0.33 wt. % nitrogen by Kjeldahl method.

EXAMPLE 3

Into a clean flask was placed a sample of polymer from Example 1 (5 g) and THF (100 ml) and the polymer dissolved in the solvent. To the solution was added 5 ml. of 1.0 N HCl and the mixture refluxed for 2 hours at ca. 60° C. The polymer was isolated by precipitation with a large volume of methanol, then dried in a vacuum oven overnight to yield 4.5 g. of a clear straw colored polymer. The nitrogen level of the resulting polymer was 0.18% (Kjeldahl). The infrared absorption band at 1590 cm$^{-1}$ disappeared upon hydrolysis.

EXAMPLE 4

20 grams of the anionically grafted ethylenepropylene acrylonitrile polymer of Example 1 was dissolved in 400 ml of heptane and refluxed with 5 g. potassium hydroxide dissolved in 15 cc distilled water; the refluxing taking place at ca. 90° C. for 7.0 hours. Upon cooling, 200 ml. 1N HCl was added and stirred vigorously to produce an emulsion.

The emulsion was precipitated into 2 liters of i-propanol, isolated and then washed with acetone (twice with 500 ml. portions). The resulting polymer was dried in a vacuum oven at 100° C. for 15 hours after which time 20.3 g of polymer was recoverd (a yield of 100%). The nitrogen level of the resulting polymer was 0.12% (Kjeldahl). The infrared band at 1715 cm$^{-1}$ increased substantially while the band at 1590 cm$^{-1}$ disappeared as a consequence of this alkaline hydrolysis.

EXAMPLE 5

5 grams of the copolymer of Example 2 was dissolved in 100 ml. heptane and refluxed with 1 g potassium hydroxide dissolved in 3 cc distilled water; the refluxing taking place at ca. 86° for 6½ hours. The organic phase was washed twice with 100 ml portions of 1.0 HCl and the resulting aqueous layer separated from the organic phase. The polymer was isolated by precipitation with a large volume of acetone (1500 ml) then washed with additional acetone (500 ml). The resulting polymer was dried in a vacuum oven at 100° C. for about 15 hours, after which 3.8 g of polymer was recovered (a yield of 76%). The nitrogen level of the resulting polymer was 0.33% (Kjeldahl). The infrared bands at 1715 cm$^{-1}$ and 1670 cm$^{-1}$ increased substantially with a loss of the 1590 cm$^{-1}$ band as a consequence of this acidic hydrolysis.

EXAMPLE 6

5 g of product of Example 4 was dissolved in xylene (100 ml) and then carefully refluxed (140°) under a nitrogen atmosphere with a solution of 1 g diethylene triamine in 5 ml. xylene for 8½ hours. The solution was cooled to ambient temperature and the polymer recovered by precipitation from i-propanol (1 liter). The resulting polymer was washed with acetone (500 ml); then dried in a vacuum oven at 100° C. for 15 hours after which 4.8 g of polymer was recovered (a yield of 96%). The nitrogen level of the resulting polymer was 0.25% (Kjeldahl). The infrared showed a loss of the peak at 1715 cm$^{-1}$ and an increase in the band at 1670 cm$^{-1}$ as a result of this reaction.

EXAMPLE 7

5 g of product of Example 4 was dissolved in xylenes (100 ml) and then carefully refluxed (136°) under a nitrogen atmosphere with a solution of 1 g triethylene tetraamine in 5 ml. xylenes for 7½ hours. The solution was cooled to ambient temperature and the polymer recovered by precipitation from a polar solvent. Vacuum drying at 100° C. for 15 hours produced 4.6 g of polymer (a yield of 92%). The nitrogen level of the resulting polymer was 0.30% (Kjeldahl). The infrared showed an increase in the peak at 1670 cm$^{-1}$.

EXAMPLE 8

5 g of product of Example 4 was dissolved in xylene (100 ml) and then carefully refluxed (140°) under a nitrogen atmosphere with a solution of 1 g tetraethylene pentamine in 5 ml. xylenes for 6 hours. The solution was cooled to ambient temperature and the polymer was recovered by precipitation from acetone (1.5 l). The polymer was washed with 500 ml. acetone; then vacuum dried at 100° C. for 15 hours, after which 4.6 g. of polymer was recovered (a yield of 96%). The nitrogen level of the resulting polymer was 0.36% (Kjeldahl). The infrared showed a loss of the peak of 1715 cm$^{-1}$ and an increase in the band at 1670 cm$^{-1}$.

EXAMPLE 9

In this example the efficacy of the anionic-graft polymers of this invention, particularly with regard to their unusual dispersancy properties in lubricating oil applications, is illustrated by comparison with a commercially available multifunctional V.I. improver, sold as Lz3702 by Lubrizol Corporation of Cleveland, Ohio, and believed to be of the type described in U.S. Pat. No. 3,272,746 in a Sludge Inhibition Bench Test (hereinafter designated SIB). The SIB test has been found, after a large number of evaluations, to be an excellent test for assessing the dispersing power of lubricating oil dispersant additives.

The medium chosen for the SIB test was a used crankcase mineral lubricating oil composition having an original viscosity of about 325 SUS at 38° C. that had been used in a taxicab that was driven generally for short trips only, thereby causing a buildup of a high concentration of sludge precursors. The oil that was used contained only a refined base mineral lubricating oil, a viscosity index improver, a pour point depressant and zinc dialkyldithiophosphate antiwear additive. The oil contained no sludge dispersant. A quantity of such used oil was acquired by draining and refilling the taxicab crankcase at 1000-2000 mile intervals.

The Sludge Inhibition Bench Test is conducted in the following manner: The aforesaid used crankcase oil, which is milky brown in color, is freed of sludge by centrifuging for 1 hour at about 39,000 gravities (gs.). The resulting clear bright red supernatant oil is then decanted from the insoluble sludge particles thereby separated out. However, the supernatant oil still contains oil-soluble sludge precursors which on heating under the conditions employed by this test will tend to form additional oil-insoluble deposits of sludge. The sludge inhibiting properties of the additives being tested are determined by adding to portions of the supernatant used oil, a small amount, such as 0.5, 1 or 2 weight percent, on an active ingredient basis, of the particular additive being tested. Ten grams of each blend being tested is placed in a stainless steel centrifuge tube and is heated at 138° C. for 16 hours in the presence of air. Following the heating, the tube containing the oil being tested is placed in a stainless steel centrifuge tube and is heated at 138° C. for 16 hours in the presence of air. Following the heating, the tube containing the oil being tested is cooled and then centrifuged for 30 minutes at about 3900 gs. Any deposits of new sludge that form in this step are separated from the oil by decanting the supernatant oil and then carefully washing the sludge deposits with 25 ml. of pentane to remove all remaining oil from the sludge. Then the weight of the new solid sludge that has been formed in the test, in milligrams, is determined by drying the residue and weighing it. The results are reported as % of sludge dispersed by comparison with a blank not containing any additional additive. The less new sludge formed, the larger the value of percent sludge dispersed, and the more effective is the additive as a sludge dispersant. In other words, if the additive is effective, it will hold at least a portion of the new sludge that forms on heating and oxidation stably suspended in the oil so it does not precipitate down during the centrifuging. Using the above-described test, the dispersant action of 6 polymers prepared in accordance with this invention were compared with the dispersing power of dialyzed product obtained from dialysis of a commercial dispersant previously referred to as Lz3702. Sufficient dialyzed residue which analyzed about 0.4 wt. % nitrogen, was dissolved in S-150N mineral oil to provide a 10% active ingredient concentrate. The dialyzed residue and polymer products of the invention were appropriately diluted in mineral oil to furnish the 0.5 and 1.0 wt. % of added additive to the used oil. The test results are given in Table I.

TABLE I

| Polymer Product of | Conc. gms. Polymer 10 gms. Used Oil | % Sludge Dispersed |
|---|---|---|
| Example 3 | 0.1 | 100 |
|  | 0.05 | 83 |
| Example 4 | 0.1 | 0 |
|  | 0.05 | 15 |
| Example 5 | 0.1 | 81 |
|  | 0.05 | 71 |
| Example 6 | 0.1 | 22 |
|  | 0.05 | 53 |
| Example 7 | 0.1 | 0 |
|  | 0.05 | 40 |
| Example 8 | 0.1 | 0 |
|  | 0.05 | 38 |
| Lz 3702 | 0.1 | 89 |
|  | 0.05 | 73 |

The hydrolyzed anionic graft copolymers of the invention showed dispersant properties at 0.5 wt %. (Examples 3-5) concentration in mineral oil lubricants with performance comparable to a commercial multifunctional V.I. improver (compare Example 5 with Lz 3702) or superior thereto (compare Example 3 with Lz 3702). Modest derivatization with alkylene polyamines to enhance the hydrolyzed polymers activity for inhibiting piston varnish formation modestly improved sludge dispersant activity as measured above (compare Examples 6, 7 and 8 with Example 4).

The invention in its broader aspects is not limited to the specific details shown and described and departures may be made from such details without departing from the principles of the invention and without sacrificing its chief advantages.

What is claimed is:
1. An oil soluble hydrolyzed anionic-graft polymer having a number average molecular weight in the range of about 1,000 to 500,000 while containing in the range of about 0.005 to 2 wt. % nitrogen and being useful as an oil additive having dispersancy properties, said anionic-graft polymer being a graft polymer of:
1. an anionically polymerizable monomer containing in the range of about 3 to 24 carbon atoms and at least one electron withdrawing group in such proximity to an olefinic bond that said bond is activated, said monomer being a nitrile monomer of the formula:

wherein R$^v$ is hydrogen or lower alkyl up to about 12 carbons, X is selected from the group consisting of hydrogen, halogen, cyano and lower alkyl up to 6 carbons; and, 2. an anion of an oxidized ethylene copolymer comprising about 20 to 80 mole % ethylene and about 20 to 80 mole % propylene; said anionic graft polymer being either acid or base hydrolyzed.

2. An oil soluble hydrolyzed graft polymer according to claim 1, wherein said monomer is acrylonitrile.

3. An oil soluble hydrolyzed graft polymer according to claim 2, wherein said anionic graft polymer is hydrolyzed with acid.

4. An oil soluble hydrolyzed graft polymer according to claim 2, wherein said anionic graft polymer is hydrolyzed with base.

5. An oil soluble hydrolyzed graft polymer according to claim 4, wherein said base hydrolyzed graft polymer is further reacted with an amine containing 2 to 60 carbon atoms and 1 to 12 nitrogen atoms per molecule.

6. An oil soluble hydrolyzed graft polymer according to claim 5, wherein said amine is a polyethyleneamine.

7. An oil soluble graft polymer according to claim 1, wherein said molecular weight is in the range of 10,000 to 200,000; said ethylene copolymer contains up to 20 mole %, based on the molar amount of ethylene and propylene units, of olefin selected from the group consisting of olefins of the formula $RCH = CH_2$, where R is an aliphatic or cycloaliphatic radical of 2 to 48 carbons and diolefins of 4 to 26 carbon atoms; said nitrile is acrylonitrile, and said hydrolysis is an acid hydrolysis.

8. A lubricating oil composition comprising a major amount of mineral lubricating oil and about 0.1 to 10 wt. % of an oil soluble hydrolyzed anionic-graft polymer having a number average molecular weight in the range of about 1,00 to 500,000 while containing in the range of about 0.005 to 2 wt.% nitrogen and being useful as an oil additive having dispersancy properties, said anionic-graft polymer being a graft polymer of:

1. an anionically polymerizable monomer containing in the range of about 3 to 24 carbon atoms and at least one electron withdrawing group in such proximity to an olefinic bond that said bond is activated, said monomer being a nitrile monomer of the formula:

wherein $R^v$ is hydrogen or lower alkyl up to about 12 carbons, X is selected from the group consisting of hydrogen, halogen, cyano and lower alkyl up to 6 carbons; and 2. an anionic of an oxidized ethylene copolymer comprising about 20 to 80 mole % ethylene and about 20 to 80 mole % propylene; said anionic graft polymer being either acid or base hydrolyzed.

9. A lubricating oil composition according to claim 8, wherein said monomer is acrylonitrile.

10. A lubricating oil composition according to claim 8, wherein said anionic graft polymer is hydrolyzed with acid.

11. A lubricating oil composition according to claim 8, wherein said anionic graft polymer is hyrolyzed with base.

12. A lubricating oil composition according to claim 11, wherein said base hydrolyzed graft polymer is further reacted with an amine containing 2 to 60 carbon atoms and 1 to 12 nitrogen atoms per molecule.

13. A lubricating oil compostion according to claim 12, wherein said amine is a polyethyleneamine.

14. A lubricating oil composition according to claim 8, wherein said molecular weight is in the range of 10,000 to 200,000; said ethylene copolymer contains up to 20 mole %, based on the molar amount of ethylene and propylene units, of olefin selected from the group consisting of olefins of the formula $RCH = CH_2$, where R is an aliphatic or cycloaliphatic radical of 2 to 48 carbons and diolefins of 4 to 26 carbon atoms; said nitrile is acrylonitrile, and said hydrolysis is an acid hydrolysis.

15. A process of preparing a hydrolyzed anionic-graft polymer comprising the steps of:

1. contacting an oxidized ethylene copolymer comprising about 20 to 80 mole % ethylene and about 20 to 80 mole % propylene, having an oxygen content of from about 0.005 to 6% based on the weight of said copolymer, with an alkyl-lithium compound of from 3 to 10 carbons under anhydrous conditions and inert atmosphere for a period of between 1 and 25 hours and at a temperature between 20° and 100° C.; whereby an anion of said oxidized ethylene copolymer is produced;

2. contacting said anion with an anionically polymerizable monomer at a temperature between about 0° and about 100° C. and for a period of between about 0.2 and 15 hours in the presence of a base whereby an anionic-graft polymer is produced, and wherein said anionically polymerizable monomer is a nitrile monomer of the formula:

wherein $R^v$ is hydrogen or lower alkyl, X is selected from the group consisting of hydrogen, halogen, cyano and lower alkyl; and 3. hydrolyzing with acid or base.

16. A process according to claim 15, wherein said anionic graft polymer is hydrolyzed with acid.

17. A process according to claim 15, wherein said anionic graft polymer is hydrolyzed with base.

18. A process according to claim 15, wherein said base hydrolyzed graft polymer is further reacted with an amine containing 2 to 60 carbon atoms and 1 to 12 nitrogen atoms per molecule.

19. A process according to claim 18, wherein said base hydrolyzed graft polymer is further reacted with an amine containing 2 to 60 carbon atoms and 1 to 12 nitrogen atoms per molecule.

20. A process according to claim 19, wherein said amine is a polyethyleneamine.

21. A process according to claim 15, wherein said molecular weight is in the range of 10,000 to 200,000; said ethylene copolymer contains up to 20 mole %, based on the molar amount of ethylene and propylene units, of olefin selected from the group consisting of olefins of the formula $RCH = CH_2$, where R is an aliphatic or cycloaliphatic radical of 2 to 48 carbons and diolefins of 4 to 26 carbon atoms; said nitrile is acrylonitrile, and said hydrolysis is an acid hydrolysis.

* * * * *